United States Patent [19]

Nicholson

[11] Patent Number: 4,688,915
[45] Date of Patent: Aug. 25, 1987

[54] FILM CASSETTE SYSTEM

[76] Inventor: Peter Nicholson, 11-51 44th Dr., Long Island City, N.Y. 11101

[21] Appl. No.: 867,470

[22] Filed: May 27, 1986

[51] Int. Cl.$^4$ .................... G03B 17/26; G03D 3/02
[52] U.S. Cl. .................................. 354/285; 354/326
[58] Field of Search ............................ 354/275–283, 354/303, 305, 307, 311, 315, 326

[56] References Cited

U.S. PATENT DOCUMENTS

| | | | |
|---|---|---|---|
| 650,622 | 5/1900 | Unger | 354/285 |
| 773,157 | 5/1913 | Huebner | 354/276 |
| 1,439,509 | 12/1922 | Fairchild | 354/277 X |
| 2,114,638 | 4/1938 | Parker | 354/277 |
| 2,648,265 | 8/1953 | Candela | 354/277 |
| 3,373,673 | 3/1968 | Craig | 354/285 |
| 3,427,949 | 2/1969 | Knight et al. | 354/326 X |
| 4,195,923 | 4/1980 | Craven et al. | 354/315 X |

Primary Examiner—Donald A. Griffin
Attorney, Agent, or Firm—Brumbaugh, Graves, Donohue & Raymond

[57] ABSTRACT

A film holding cassette comprises a frame having film holding means for receiving and holding a photographic plate in a first position in the frame. The frame has track means for receiving a substantially light proof front cover plate for movement between a first position substantially overlying one side of the photographic plate, and a second position adjacent the first position wherein the cover plate does not overlie the photographic plate. The track means also receives a substantially light-proof back cover plate for movement between a first position substantially overlying the other side of the photographic plate to protect the photographic plate from exposure, and a second position adjacent the first position wherein the cover plate does not overlie the photographic plate to allow entry and removal of the photographic plate from the film holding means. The front cover plate includes means for detachably engaging its front edges to a light filter means associated with a camera, so that the light filter means occupies the first position substantially overlying one side of a photographic plate when the front cover plate is in its second position.

9 Claims, 4 Drawing Figures

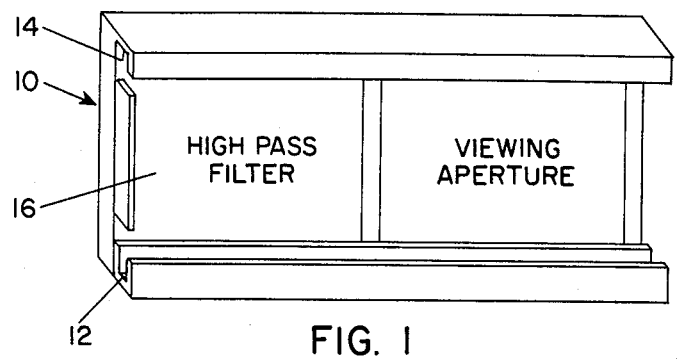
FIG. 1
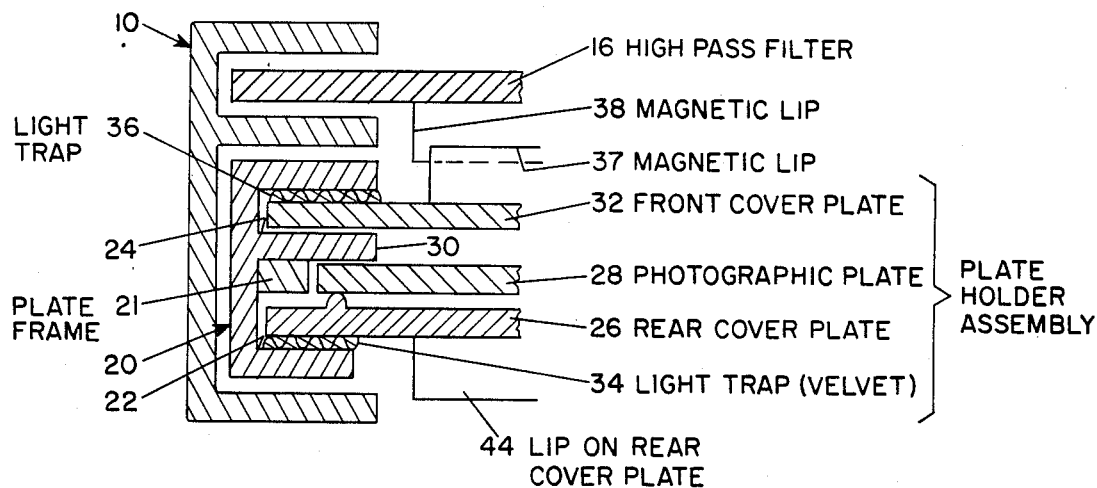
FIG. 2
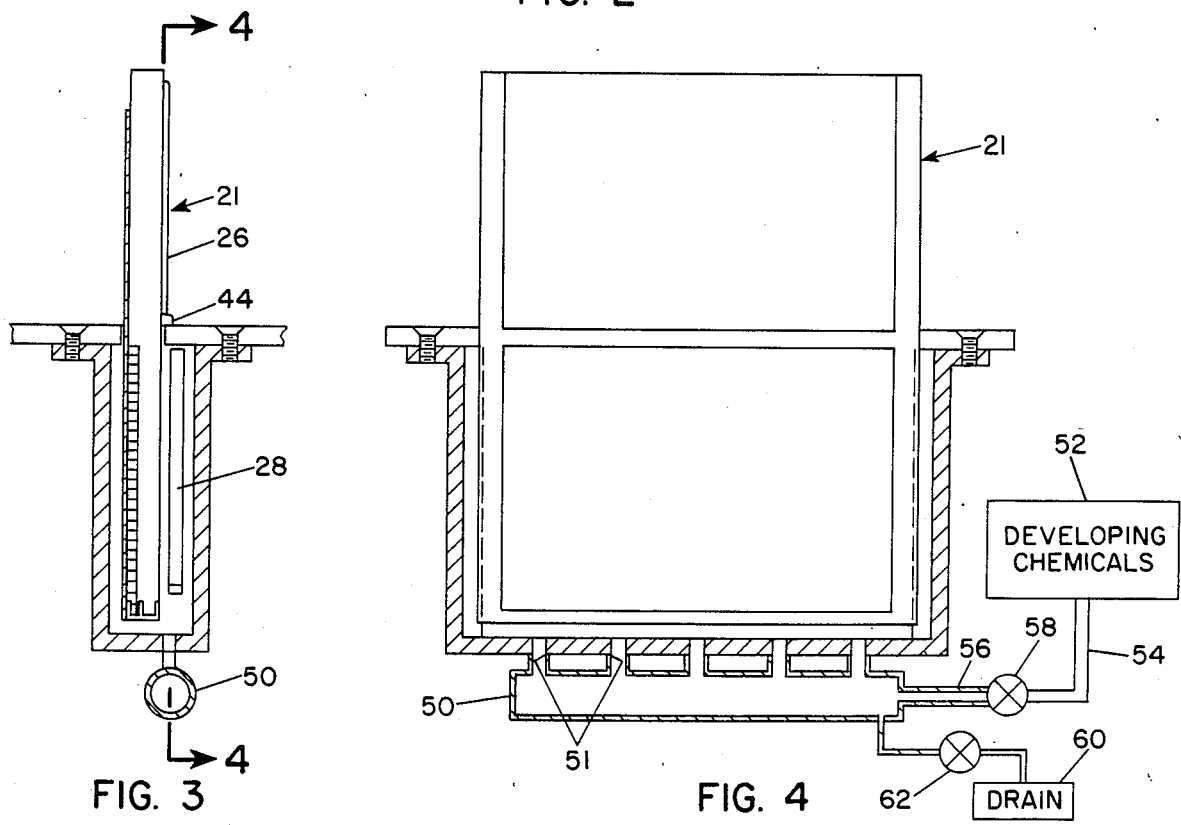
FIG. 3
FIG. 4

FILM CASSETTE SYSTEM

BACKGROUND OF THE INVENTION

This invention relates to a film plate holder, transport and shutter mechanism for a camera and more particularly to a holographic recording system including a holographic camera, film cassette mechanism, and developing station.

In my co-pending patent application, Ser. No. 508,499, filed June 27, 1983, entitled Shutterless Pulse Laser Recording System and Method, I describe a method whereby live subject matter such as a human being may be exposed to continuous white light illumination before and during exposure to pulse laser light. The recording material is protected from exposure and fogging by a high pass filter over the recording material in conjunction with a low pass filter over the continuous white light illumination beam which parallels the path of the laser beam.

In many projected medical and portraiture applications it is desirable if not necessary to employ simple, reliable and secure film transport and handling under normal ambient light conditions of operating theaters and portrait studios. It is also desirable for the holographic camera operator to directly view the subject matter and make lighting adjustments from the many viewpoints of the holographic window. It is further desirable that the film not only be safely handled in normal ambient light, but also that it may be safely inserted into and removed from both the holographic camera and a processing tank.

SUMMARY OF THE INVENTION

In accordance with the present invention, a film holding cassette is provided which is adapted for use in a holographic camera and an associated film processor. A film holding cassette comprises a frame having film holding means for receiving and holding a photographic plate in a first position in the frame. The frame has track means for receiving a substantially light proof front cover plate for movement between a first position substantially overlying one side of the photographic plate, and a second position adjacent the first position wherein the cover plate does not overlie the photographic plate. The track means also receives a substantially light-proof back cover plate for movement between a first position substantially overlying the other side of the photographic plate to protect the photographic plate from exposure, and a second position adjacent the first position wherein the cover plate does not overlie the photographic plate to allow entry and removal of the photographic plate from the film holding means. The front cover plate includes means for detachably engaging its front edges to a light filter means associated with a camera, so that the light filter means occupies the first position substantially overlying one side of a photographic plate when the front cover plate is in its second position.

According to the preferred embodiment, the frame has a generally rectangular shape with two opposed longer sides and two opposed shorter sides, with front and rear cover plates each about one-half the size of the frame in the longer direction thereof. The track means preferably comprises a pair of generally U-shaped channels along the inner side of the frame in its long direction, to receive and slidably hold the edges of the front and rear cover plates. A light trap means is preferably provided in the form of velvet strips to provide a substantially light-proof seal between the frame edges and the edges of the front and rear cover plates.

The film holding cassette is adapted to be inserted into a cassette holder in a holographic camera. The cassette holder associated with the holographic camera preferably comprises a pair of parallel channels adapted to receive the long edges of the film holding cassette in a sliding manner.

During operation, a photographic plate is loaded into the film holding means in the frame in a dark room to avoid exposure to the plate. The front and rear cover plates are then slid in their first respective positions to overlie the front and rear sides of the photographic plate. The film holding cassette is then slid into the cassette holding means associated with the holographic camera. The cassette holding means of the holographic camera preferably comprises a highpass filter over the aperture between the two channels. The high-pass filter preferably has a lip on one of its edges which is adapted to engage a corresponding lip on the front cover plate when the film holding cassette is slid into the cassette holding means of the holographic camera. As the film holding cassette is slid into the camera, the front cover plate is moved from its first position substantially overlying the photographic plate, to a second position revealing the photographic plate. The high-pass filter is thus disposed between the viewing aperture and photographic plate and prevents the plate from being exposed. The rear cover plate stays in its first position over the photographic plate during this time. The operator is then free to expose the photographic plate using a pulser laser having a wave length which exceeds the cut off wave length of the high pass filter. When the photographic plate is exposed, the film holding cassette can be removed from the holographic camera. This is done by sliding the film cassette along the channels in the holographic camera. In order to prevent the photographic plate from being exposed to ambient light, the associated lips of the high-pass filter and front cover plate are preferably magnetic and magnetically engage each other so that when the film cassette holder is removed from the camera, the front cover plate is moved from its second position back to its first position wherein it substantially overlies the photographic plate.

After the film holding cassette is removed from the camera, it may be inserted into a developing tank. The developing tank preferably comprises a slotted opening having a width slightly greater than the width of the film cassette holder, and a length just larger than the length of the film holding cassette in its shorter direction thereof. The film holding cassette is placed into the camera, and engagement means located near the opening of the developing tank engage a lip on the rear cover plate and push it from its first position overlying the photoghraphic plate to its second position wherein it does not overlie the photographic plate. When the film holding cassette is fully inserted into the developing tank, the photographic plate is not overlaid by the rear cover plate, and is allowed to drop out of the film holding cassette and into the developing tank. The film holding cassette can then be removed from the developing tank and appropriate developing chemicals can be pumped in and out of the tank to develop the plate. When the plate is fully developed and dry, it can be removed from the developing tank for viewing, and the film holding cassette can be reloaded with a new unexposed plate in the manner described above.

In accordance with the foregoing, the present invention provides a film holding cassette to be used in conjunction with a holographic camera and developing tank, wherein holographic plates can be easily handled with minimum risk of overexposure to ambient light and with minimum contact with an operator's hands.

BRIEF DESCRIPTION OF THE DRAWINGS

FIG. 1 is a perspective view of a cassette, holding means associated with a camera;

FIG. 2 is a cross-sectional view of the cassette holding means of a camera shown holding a film holding cassette in accordance with the invention;

FIG. 3 is an elevational view, in cross-section, of a film processing tank shown receiving the film holding cassette in accordance with the invention; and FIG. 4 is a front elevational view, in partial cross-section, of the film processing tank shown receiving the film holding cassette in accordance with the invention.

DESCRIPTION OF THE PREFERRED EMBODIMENT

As shown in FIG. 1, the rear of the holographic camera comprises a cassette holding means 10, which is a substantially rectangular frame having a bottom U-shaped channel 12 and a top U-shaped channel 14. The right hand half of the cassette holding means has a viewing aperture for an operator to view the subject under consideration before taking a holographic image of the subject. The left one half side of the cassette holding means has a high pass filter disposed to block relatively low frequency wavelengths from reaching the photographic film in a film holding cassette when it is received in the cassette holding means.

FIG. 2 shows the cassette holding means 10 in cross-section, and also showing a film holding cassette 20 in accordance with the invention. The film holding cassette has a pair of tracks 22 and 24 extending the full length thereof. One of the tracks 22 is adapted to receive a rear cover plate 26 which in turn holds a photographic plate 28 against center track 30 in the center of the film holding cassette. The other track 24 is adapted to receive a front cover plate 32. Respective light traps 34 and 36 are disposed on the rear cover plate and front cover plate respectively in order to keep light from exposing the photographic plate 28. These light traps can be formed of velvet strips either attached to the rear cover plate and front cover plates, and/or the edges of the plate frame 21.

The front cover plate 32 has a leading edge or lip 37 formed of magnetic material. The magnetic lip 37 is adapted to engage a similar leading edge or lip 38 on the high-pass filter 16 to create a light-tight magnetic connection. When the plate holder is slid into slide assembly 10 in the camera the magnetic lip 37 of the front cover plate 32 magnetically engages with the magnetic lip 38 of the high-pass filter 16. The filter then slides into position over the viewing aperture as the slide assembly 10 is slid into the camera. As the plate holder assembly 10 is slid into the camera, the front cover plate 26 is retracted, and the photographic plate 28 is urged into position behind the high-pass filter 16 and over the viewing aperture. The film can then be exposed to a pulse of laser light which passes through the high-pass filter. Subsequently, the plate holder or frame 21 can be withdrawn from the slide assembly 10 of the camera, and during this removal, the magnetic connection between the high-pass filter 16 and the front cover plate 32 formed by the respective magnetic lips 37 and 38 will cause the front cover plate to automatically drawn over the exposed photographic plate 28 making a light tight cover. When the plate frame 21 is at the extreme left of the slide assembly 10 as shown in FIG. 1, a firm pull on the plate frame 21 will break the magnetic connection between the front cover plate 32 and the high-pass filter 16, thus freeing the plate holder from the camera. The plate holder 21 is then ready to be inserted into an automatic film processor.

As shown in FIGS. 3 and 4, the film processor comprises a processing tank having a rectangular-sized opening configured to receive the plate frame 21. The rear cover plate 26 has a lip 44 which extends along the width thereof. When the slide assembly 10 is inserted into the film processing tank, this lip 44 engages the edge of the opening of the tank, makes a light-tight connection therewith, and holds the rear cover plate 26 above the tank as the slide assembly 10 is inserted into the tank. When the slide assembly 10 is fully inserted into the tank as shown in FIG. 3, the photographic plate 28 is allowed to drop out of the slide assembly 10 into the tank. Processing may be performed by pumping appropriate chemicals and washes into and out of the processing tank in a conventional manner. When the plate 28 is dried, it may be removed for viewing and the plate holder or frame 21 may be reloaded with a new photographic plate.

As shown in FIGS. 3 and 4, in order to inject chemicals and washes into the processing tank, the tank is provided with a chemical supply reservoir 50 which communicates with the tank by apertures 51 formed along the bottom of the tank. The reservoir 50 also communicates with a source of developing chemicals 52 by way of supply leads 54 and 56 which are separated by a pump 58. Further, a drain 60 is provided in communication with the reservoir 50 by means of a valve or pump 62 in order to flush the used chemicals from the tank in reservoir 50.

Photographic film may be conveniently handled by placing cut film between two thin sheets of glass that are then inserted into the plate holder 21. However, if this glass sandwich approach is used, the final step of inserting the plate holder into the automatic processor should not be followed, since the glass would also be deposited into the processor. If the glass sandwich approach is used, the film should be removed manually and then processed in a darkroom.

While a specific embodiment of the invention has been shown and described, numerous variations and modifications will readily occur to those skilled in the art. Therefore, the invention is not intended to be limited by the foregoing preferred embodiment, but only by reference to the appended claims.

I claim:

1. A film holding cassette adapted for use in a camera and film processor, comprising:
    a frame having film holding means for receiving and holding a photographic plate in a first position in said frame;
    a substantially light-proof front cover plate;
    a substantially light-proof back cover plate; track means in said frame for receiving said front cover plate for movement between a first position substantially overlying one side of a photographic plate, and a second position adjacent said first position wherein it does not overlie said photographic plate, and for receiving said back cover plate for movement between a first position substantially overlying the other side of the photographic plate to protect the photographic plate from exposure, and a second position adjacent said first position wherein it does not overlie the photographic plate, to allow entry and removal of the photographic plate from the film holding means;

and wherein said front cover plate includes means for detachably engaging one front edge of the front cover plate to a light filter means associated with a camera, so that the light filter means occupies a first position substantially overlying one side of a photographic plate when the front cover plate is in its second position.

2. The film holding cassette according to claim 1 wherein said frame is substantially oblong having two opposed longer sides and two opposed shorter sides, and wherein said front and back cover plates are each about one-half the size of the frame in the longer direction.

3. The film holding cassette according to claim 2 wherein the track means comprises a pair of generally U-shaped channels along the inner side of the frame in its longer direction, to receive and slidably hold opposed edges of both the front and rear cover plates.

4. The film holding cassette according to claim 1 further including light trap means for providing a substantially light-proof seal between the frame side edges and the side edges of the front and rear cover plates.

5. The film holding cassette according to claim 4 wherein the light trap means comprises velvet strips attached to the frame side edges and side edges of the front and rear cover plates.

6. A film cassette system including the film holding cassette according to claim 1 and further including a camera having a cassette holding means formed by two opposed U-shaped channels for slidably receiving and holding the film holding cassette, and also having light filter means.

7. The film cassette system according to claim 6 and further including a film processing tank having an opening for receiving the frame of the film holding cassette, and having engagement means for engaging an edge of the rear cover plate to keep it outside of the tank when the frame is received therein, whereby the photographic plate can drop into the tank after the frame is inserted into the tank.

8. The film cassette system according to claim 7, wherein the tank includes means for forming a substantially light proof seal with the frame to prevent exposure of the photographic plate to outside light.

9. The film cassette system according to claim 7 wherein the film processing tank includes supply means for delivering film developing chemicals to the tank.

* * * * *